United States Patent [19]

Ahern et al.

[11] Patent Number: 5,387,331
[45] Date of Patent: Feb. 7, 1995

[54] WAFER CUTTING DEVICE

[75] Inventors: Brian S. Ahern, Boxboro; David W. Weyburne, Maynard; Gerald W. Iseler, Chelmsford; Harry R. Clark, Jr., Townsend, all of Mass.

[73] Assignee: The United States of America as represented by the Secretary of the Air Force, Washington, D.C.

[21] Appl. No.: 246,899

[22] Filed: May 19, 1994

[51] Int. Cl.[6] .................. B23H 7/06; B23H 7/10; B23H 7/30
[52] U.S. Cl. .................. 204/224 M; 204/225
[58] Field of Search ............ 204/224 M, 225, 129.46, 204/129.3, 129.6, 129.65

[56] References Cited

U.S. PATENT DOCUMENTS

| | | | |
|---|---|---|---|
| 3,128,213 | 4/1964 | Gault et al. | 204/129.6 X |
| 4,096,619 | 6/1978 | Cook, Jr. | 204/29.65 X |
| 4,193,852 | 3/1980 | Inoue | 204/129.46 |
| 4,409,075 | 10/1983 | Kolbesen | 204/224 M X |
| 4,574,769 | 3/1986 | Ishikawa | 125/16 R |
| 4,646,710 | 3/1987 | Schmid et al. | 125/16 R |
| 4,655,191 | 4/1987 | Wells et al. | 125/16 R |
| 4,903,682 | 2/1990 | Kurokawa | 125/16 R |
| 4,920,946 | 5/1990 | Kuromatsu | 204/224 M X |

*Primary Examiner*—Donald R. Valentine
*Attorney, Agent, or Firm*—Stanton E. Collier; Jacob N. Erlich

[57] ABSTRACT

A wafer cutting device has a plurality of individually highly tensioned diamond impregnated wires that are mounted in a translatable head. Each wire has a tension monitor connected thereto for the purpose of insuring uniform tension and also alerting to breakage. Further, a differential DC voltage is applied to the wires and the crystal with the assistance of electrolytes to improve the removal of material for minimizing damage to the surfaces. The crystal is mounted on a two dimensional stage. During normal cutting the crystal is moved vertically into the cutting wire. The vertical cutting rate is adjusted due to the configuration of the crystal. At the end of cutting, the crystal is moved laterally so as to place a notch in the wafers for the purpose of removing the wafer in a clean break.

9 Claims, 5 Drawing Sheets

FIG. 5
FIG. 6
FIG. 7
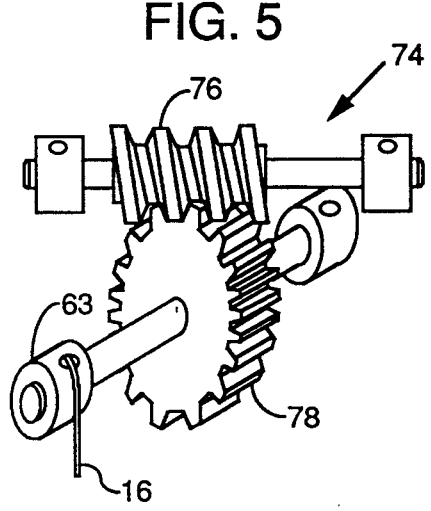
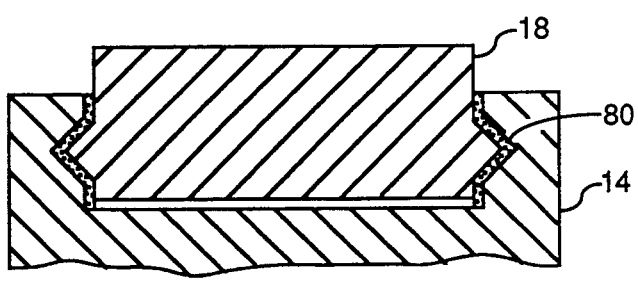
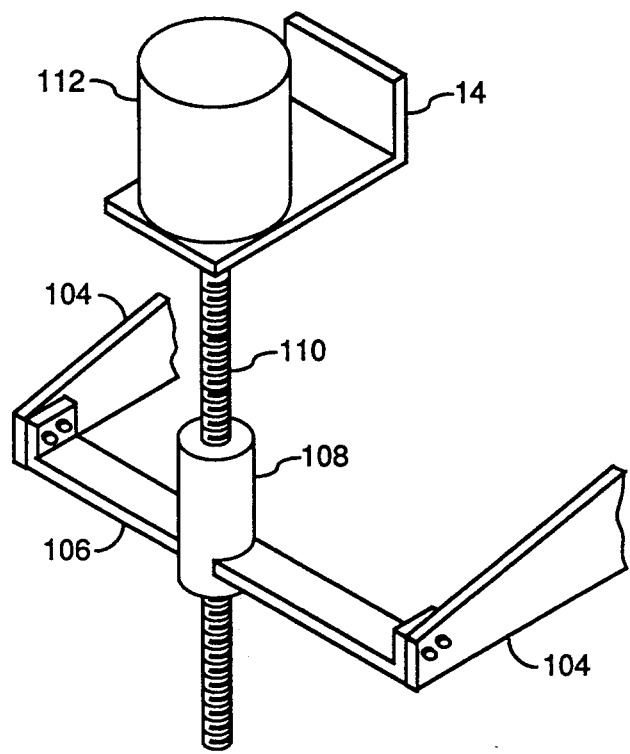

WAFER CUTTING DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates to semiconductor wafers, and, in particular, relates to the machines used in preparing wafers from the semiconductor material.

One device for cutting wafers from crystals is an edge mounted rotating metallic disk with a diamond impregnated surface on the inner diameter. The thickness of the disks on the inner diameter of the saw are typically 0.008 to 0.010 inches and they are rotating at very high speeds such as 5,000 rpm. The crystal is mounted firmly into moving assembly and processed into the moving disk. One wafer is sawn at a time at a speed of about one inch per minute. One of the disadvantages of this technique is that the high speed wheel has resonant vibrational modes that cannot be damped. This motion, combined with the irregularity of the diamond grit that rips its way through the brittle semiconductor material can impart an unacceptably high level of fracture damage into the materials such as GaAs, InP and CdTe.

The use of multiple wire cutting devices is well known in the art. For example, U.S. Pat. No. 4,574,769 discloses a multiple wire cutting device having a continuous wire wrapped multiple times around four blocks. A cutting material is applied to the wires in contact with the material to be cut. Clearly, if the wire broke, the whole crystal would be spoiled.

U.S. Pat. No. 4,646,710 discloses a multiple wire cutting device wherein a multiple of independently mounted, parallel wires are placed upon a material mounted to a rocker. The wires move as well as the rocker.

U.S. Pat. No. 4,655,191 discloses a source of multiple wires that are used to cut a material. As the wire is worn out, a wire supply moves the wires so that another used area is used for the cutting action.

U.S. Pat. No. 4,903,682 discloses a multiple wire cutting apparatus that has a single wire feed which allows multiple parallel wires to be positioned in the cutting area.

SUMMARY OF THE INVENTION

The present invention is a wafer cutting device having a plurality of individually highly tensioned diamond impregnated wires that are mounted in a translatable head. Each wire has a tension monitor connected thereto for the purpose of insuring uniform tension and also alerting to breakage. Further, a voltage is applied to the wires and the crystal with the assistance of electrolytes to improve the removal of material without damaging the surfaces. The crystal is mounted on a two dimensional stage. During normal cutting the crystal is moved vertically into the cutting wire. The vertical cutting rate is adjusted due to the configuration of the crystal. At the end of cutting, the crystal is moved laterally so as to place a notch in the wafer for the purpose of removing the wafer in a clean break.

Therefore, one object of the present invention is to provide a wafer cutting device having individually tensioned and monitored cutting wires.

Another object of the present invention is to provide a wafer cutting device that applies a voltage between the cutting wires and the crystal to aid in material removal.

Another object of the present invention is to provide a wafer cutting device is controls the rate of movement of the crystal into the cutting wires based on the crystal configuration.

Another object of the present invention is to provide a wafer cutting device that is able to notch the wafers to assist in the removal from the crystal.

Another object of the present invention is to provide a wafer cutting device wherein the wafers cut are free of microcleavage damage, flat and strain relieved, and essentially ready for final chemical polishing.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 5 is a perspective view of the geared device for holding the cutting wire of the present invention.

FIG. 6 illustrates a device for holding the cutting wire head in electrical isolation from the other parts of the present invention.

FIG. 7 illustrates by perspective view the device for vertically translating the crystal holder into the cutting wires of the cutting wire head.

DETAILED DESCRIPTION OF THE INVENTION

Figure 1:
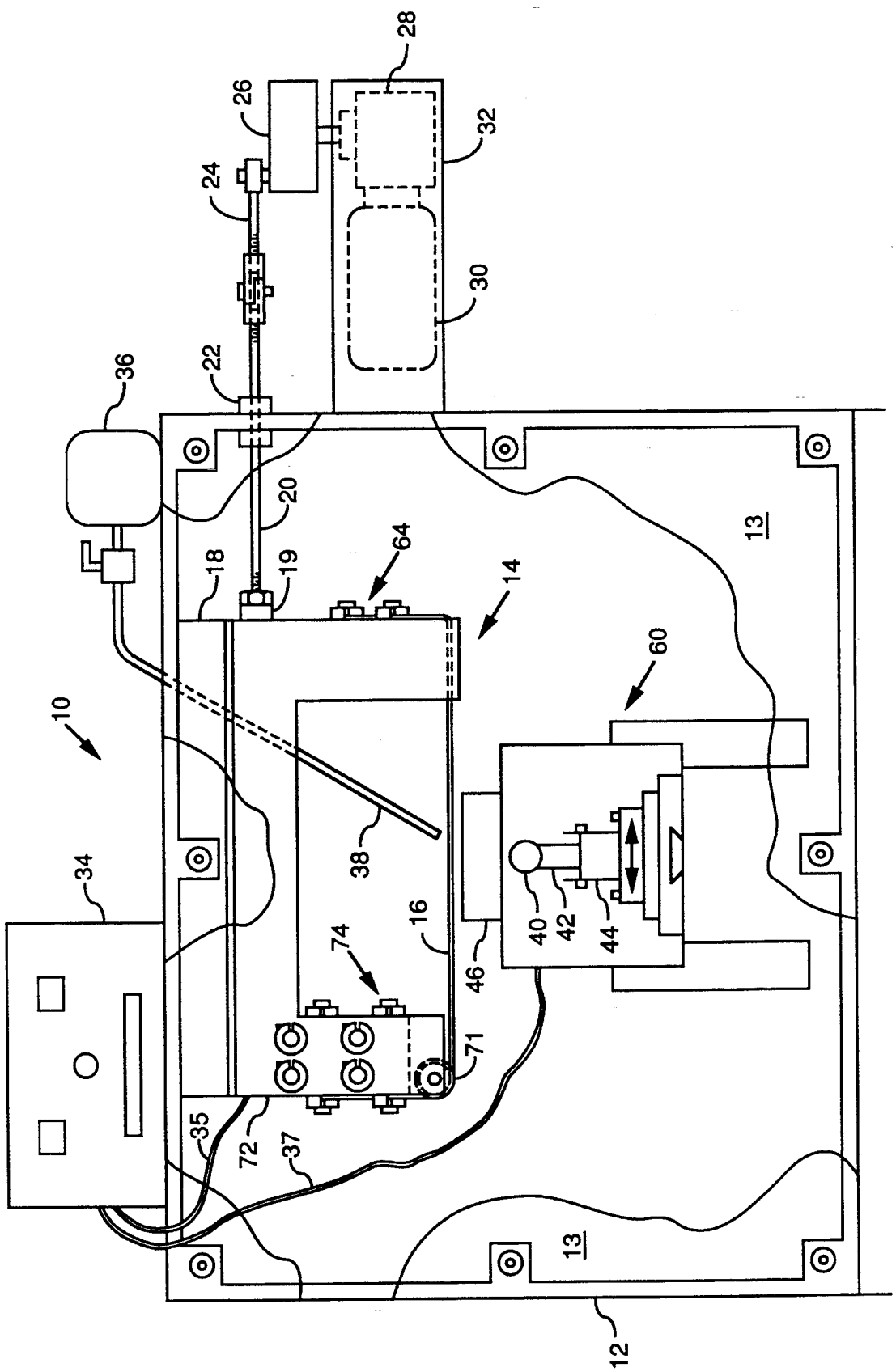
FIG. 1 illustrates the present invention in a front view.

Referring to FIG. 1, a wafer cutting device 10 is shown by front view. A support structure 12 provides the necessary strength for holding items to be detailed. The support structure 12 may have a front cover 13 attached thereto of clear material for allowing the viewing of the cutting process and for preventing the escape of any toxic material. A vent, not shown, may exhaust any gases produced in the cutting process. A translatable head 14 holds a plurality of cutting wires 16. The head 14 is mounted on a track 18 that provides electrical isolation thereto. The head 14 is translated by means of a push rod 20 slidably mounted in the support structure 12 by means a guide 22. The push rod 20 is electrically isolated from the head 14 by means of an insulating material 19 attached therebetween. The rod 20 is flexibly mounted to an arm 24 that is connected to a flywheel 26 which has a gear box 28 and a controllable motor 30 thereon. The gear box 28 and motor 30 are attached to the support structure 12 by means of a support arm 32. The motor 30 is controlled by a controller 34. A source of electrolyte cutting solution 36 is supplied to the cutting area by means of pipe 38. Example electrolytes are sodium hydroxide and nitric acid. A crystal 40 is mounted to a goniometer 42 that is attached to an adjustable holder 44 that is further translatable on the adjustable holder 44. Further detailed in FIG. 8. The adjustable holder 44 is translatably mounted to the support structure 12 by means of a track 46. The controller 34 further provides for the vertically movement of the crystal 40 into the cutting wires 16 and horizontal movement of the adjustable holder 44. Each of the separate motors herein can be controlled so as to insure that there is a very uniform cutting rate to the crystal 40. The above identified items shall be further detailed hereinafter.

Figure 2:
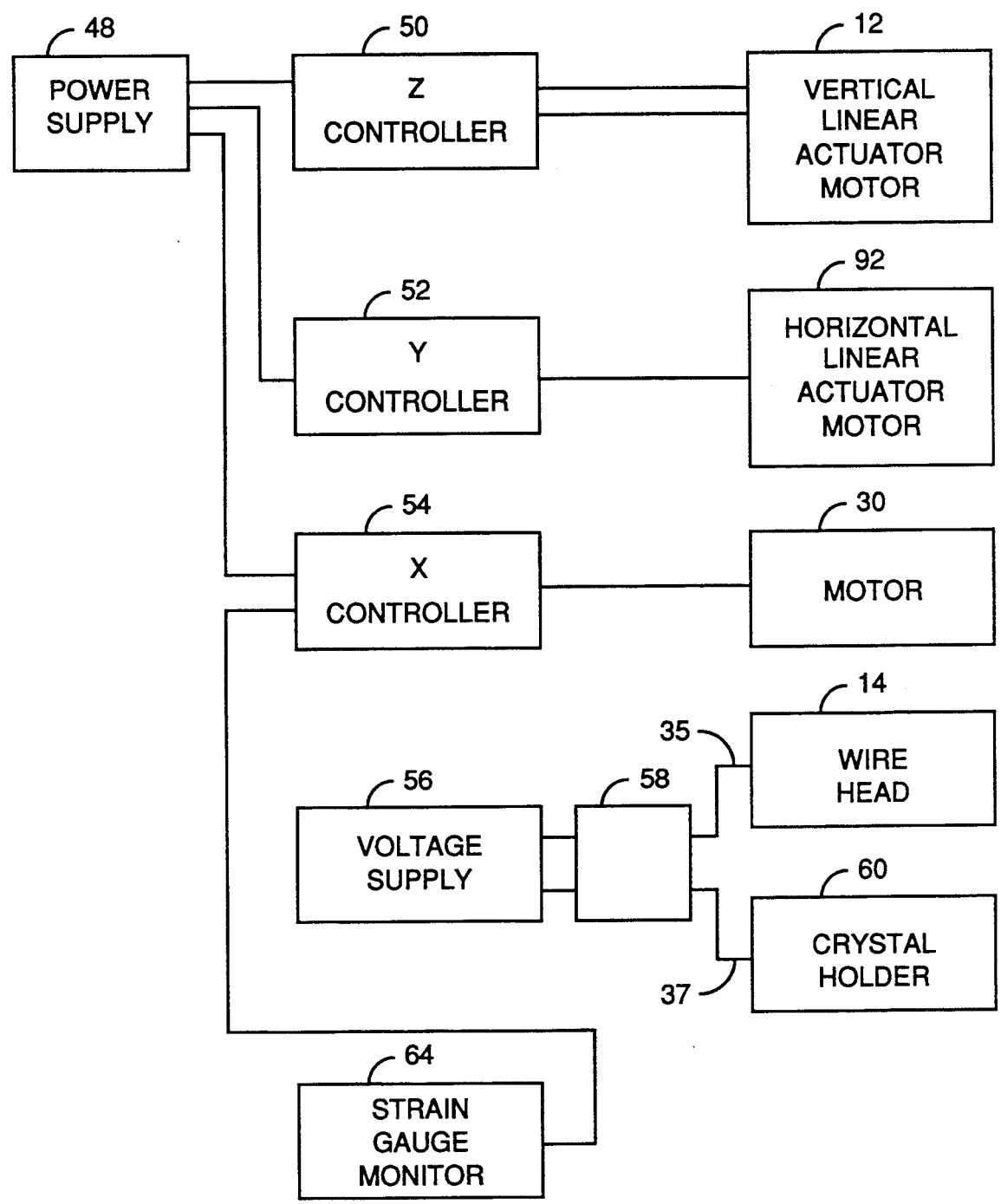
FIG. 2 illustrates by electrical schematic the electronics used by the present invention.

Referring to FIG. 2, a power supply 48 provides the necessary voltages to three controllers 50, 52 and 54 which drive linear actuators or motors such as items 12, 30 and 92. The controllers can be programmed according to the size and shape of the crystal 40. A voltage supply 56 acting through a voltage controller 58 applies the proper voltage to the wire head 14 and the crystal holder 60 by means of wires 35 and 37, respectively. Each cutting wire 16 is connected to a strain gauge 62, FIG. 3, that outputs voltages to a strain gauge monitor 64 that is further connected to the x-controller 54. If any wire 16 breaks, the controller will immediately stop the motor from moving the crystal.

Figure 3:
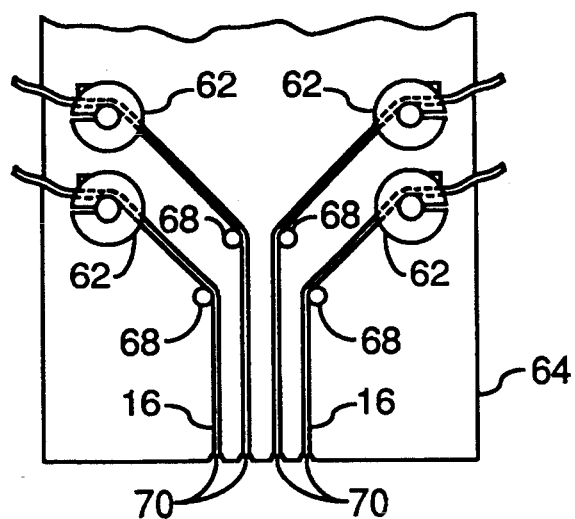
FIG. 3 illustrates by view a device for holding at one end the cutting wires of the present invention.
Figure 4:
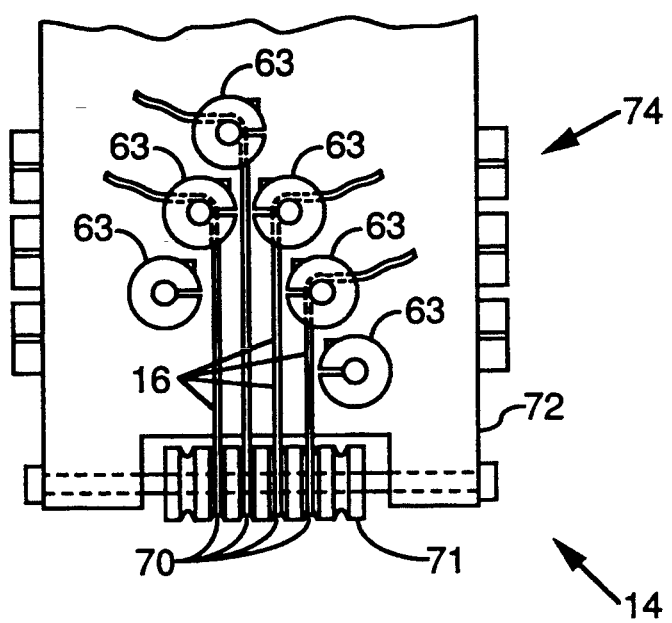
FIG. 4 illustrates by view a geared device for holding at the other end a cutting wire of the present invention.

On an end 64 of the head 14, FIG. 3, the wires 16, only four shown, are spaced apart in a preselected manner by grooves 70. The wires 16 then change direction about turning posts 68 and are each individually connected to strain gauges 62 that are connected to the strain gauge monitor 64. The strain gauge monitor 64 monitors the tension in each wire for uniformity as well as breakage. The wires 16 at the other end 72, FIG. 4, are similarly spaced apart, in a parallel manner, and are attached to adjustable tensioning devices 74, one for each wire. The wires 16 turn on a roller 71 that has grooves 70 thereon. Referring to FIG. 5, the adjustable tension device 74 is shown in perspective and removed from the end 72 of the head 14. The adjustable tension device 74 is similar in operation to a guitar string holder being composed of a screw gear 76 and a pinion gear 78. By turning the screw gear 76 the wire 16 is tensioned and this tension is not reduced by slippage.

The head 14 is mounted on a guide track 18 as shown in FIG. 6. An insulating material 80 is placed between these two items to prevent shorting since a different electrical voltage is applied to the wires 16 and head 14 than the holder 44.

Figure 8:
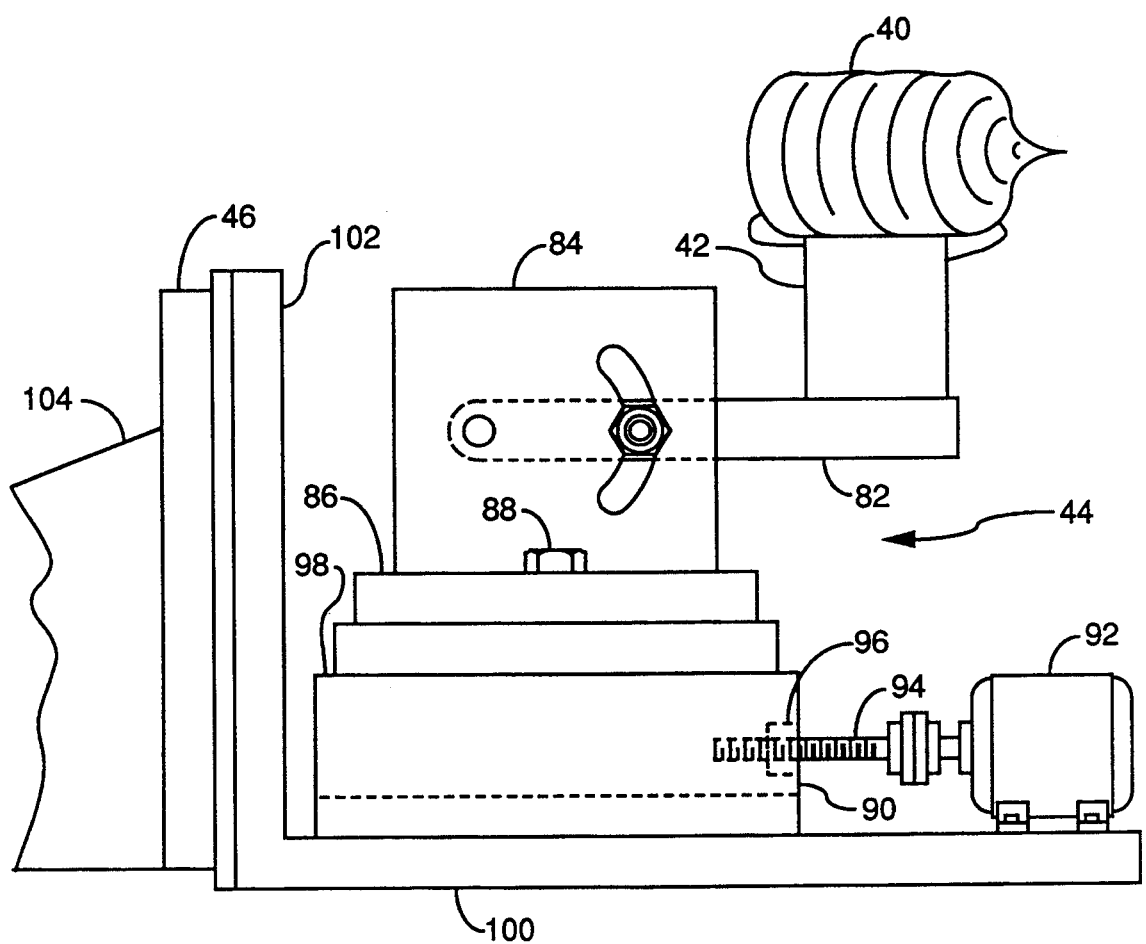
FIG. 8 illustrates by side view the crystal holder of the present invention.

Referring to FIG. 8, the crystal 40 is attached to the goniometer 42 which is bolted to an adjustable platform 82. Platform 82 is adjustably attached to support arms 84, one shown, which are further fixedly attached to a base 86 which is rotatable about a vertical axis and is secured by bolts 88. The holder 44 is mounted on a guide track 90, similar to guide track 18. A linear actuator 92 drives a screw 94 through a guide sleeve 96 attached to support base 98. This allows y-axis movement of the crystal 40 for the purpose to be detailed hereinafter.

The guide track 90 is attached to a frame 100 which has a vertical back 102. The back 102 is attached to a vertically moving guide track 46, similar to track 18. A pair of rearward arms 104 are attached to the frame 100 and pass through the back of the support structure 12. As seen in FIG. 7, the rearward arms 104 are attached to a horizontal plate 106 with a guide sleeve 108 thereon. A linear actuator motor 112 turns a screw 110 that is threaded into the guide sleeve 108. This allows the vertical movement, z-axis, of the holder 44 with the crystal 40 thereon.

In the above invention, the crystal 40 is processed up into the wires 16 at a rate of about 1 inch every 10 minutes. In one embodiment 6 wires 16 having a diameter of 0.010 inches and spaced 0.035 inches apart cut an InP crystal into 0.024 inch thick wafers with a high degree of flatness.

In the above invention, electrolyte from the supply 36 in combination with a voltage difference between the cutting wires 16 and the crystal 40 allow the removal of material with less damage thereto. A high power DC power supply provides the desired voltage, approximately 0 to 40 volts, and the electrolyte is selected by on the material being cut. Under the proper electrolytic conditions the chemistry of the semiconductor surface is altered. The bonds between the atoms are weakened so that the slicing process is less disruptive. This process is an alteration of the Fermi Level of the solid near the surface. The acronym FLAT stands for Fermi Level Adjustment Technique. The applied electric field is capable of altering the energies of surface atoms by as much as 1 electron volt/atom. This represents a substantial fraction of the binding energy between the atoms and in many cases is enough to remove material without any physical contact at all. Normal wafer slicing takes place via microscopic cleavage events caused by the sharp diamond surfaces moving into the softer material. The as-sliced surface is therefore defined by a two dimensional array of cleavage residue. Each microcleavage event sends damage into the brittle wafers. The damaged regions are electrically active and degrade the electronic properties of any devices processed thereon. Wafer fabricators get around this problem by removal of the damaged regions via lapping and etching. However, for materials like InP and CdTe the sawing damage can extend for a great distance and this procedure becomes expensive because too much of the useful material is wasted.

As noted above, the controller 34 has therein controllers 50, 52, and 54, for moving the head 14 at a desired rate, for moving the crystal in the z-axis direction at a programmed rate, and for moving the crystal in the y-axis direction for lateral slicing. The computer controlled feed rates allow the programming of the rate of slicing with respect to the fraction of material being removed. It is appropriate to move the crystal more slowly through the reciprocating wires 16 when the slicing is at full diameter. The drag on the wires id directly proportional to the amount of material sawn on each cycle. By programming the motion of the crystal, all portions of the wafer are equally exposed to microscopic cutting forces thus a more homogeneous damage profile is thereby obtained.

Lateral slicing refers to the final stage of cutting. With the y-axis drive, the crystal 40 can be move perpendicular to the wafer surface. This cut off capability is an economical way of providing a "flat." The motor can be controlled to make only a partial cut or "perforation" so that the sliced wafers are supported by only 0.005 inches of material which will act as cleavage points for easy removal of the wafers. After the short lateral cut the crystal is programmed back to its initial location and the crystal is backed out and processed to make the next six wafer slices. The wafering of the complete crystal can thus be programmed with minimal human intervention.

Clearly, many modifications and variations of the present invention are possible in light of the above teachings and it is therefore understood, that within the inventive scope of the inventive concept, the invention may be practiced otherwise than specifically claimed.

What is claimed is:

1. A wafer cutting device, said wafer cutting device comprising:
   a support structure, said support structure providing a closed environment;
   a guide track, said guide track attached to a top of said support structure, said guide track having an electrically insulating material thereon;
   means for holding cutting wires, said holding means including means for monitoring tension in said cutting wires, means for adjusting the tension in said cutting wires, and means for placing a voltage on said cutting wires;
   means for reciprocating said holding means, said reciprocating means attached fixedly to said support structure and flexibly connected to said means for holding;
   means for holding a crystal, said means for holding said crystal translatably mounted to said support structure, said means for holding said crystal being adjustable;
   means for providing a preselected electrolyte, said electrolyte being placed in an area where said cutting wires are cutting said crystal; and
   electronic control means, said electronic control means providing at least a controllable voltage to said means for reciprocating, providing a controllable voltage to a means for translating said holding means upon said support structure, and providing a controllable voltage to said crystal and cutting wires.

2. A wafer cutting device as defined in claim 1 wherein said means for holding said cutting wires comprises a translatable head, said head being mounted on said guide track, said head having an upside down U shape, said head being movable in the x-axis, said translatable head further comprising:
   a first leg, said first leg having a bottom side, said bottom side having means thereon for holding ends of a plurality of cutting wires;
   a plurality of tension gauges, said tension gauges being mounted to said first leg, one cutting wire end being mounted to each tension gauge;
   a second leg, said second leg having a bottom side, said bottom side having means thereon for holding the other ends of said plurality of cutting wires
   said means for holding the other ends having adjustable tensioning means therein.

3. A wafer cutting device as defined in claim 2 wherein said means for holding the other ends comprises helical and pinion gears.

4. A wafer cutting device as defined in claim 1 wherein said reciprocating means comprises:
   means for translating said translatable head in a reciprocating manner, said means for translating comprising:
   a push rod, said push rod connected to said head, a connection therebetween being electrically insulated;
   a drive arm, said drive arm flexibly connected to said push rod;
   a flywheel, said drive arm flexibly connected to said drive arm; and
   drive means, said drive means comprising:
      an electric motor, said motor being driven in a predetermined manner; and
      a gear box, said gear box being connected to said electric motor and to said flywheel, said drive means being fixedly mounted onto a support arm which is fixedly attached to said support structure.

5. A wafer cutting device as defined in claim 1 wherein said means for monitoring tension in said cutting wires indicates a tension in each wire and indicates a tension out-of-range condition to terminate the cutting process.

6. A wafer cutting device as defined in claim 1 wherein said means for placing a voltage on said cutting wires further places a voltage on said crystal, a difference of said voltages being in the range of 0 to 40 volts.

7. A wafer cutting device as defined in claim 1 wherein said means for holding said crystal further includes means for translating said crystal in an y-axis direction being perpendicular to said x-axis, said y-axis translation placing a lateral cut in said wafers after slicing.

8. A wafer cutting device as defined in claim 1 wherein said means for holding said crystal comprises:
   a goniometer for holding said crystal;
   a vertically adjustable platform, said goniometer mounted to said platform;
   a pair of vertical supports, said platform being adjustably mounted therein;
   a first base, said first base having said vertical supports mounted thereto;
   a second base, said second base having said first base adjustably connected thereto;
   a frame, said frame having said second base connected thereto, said frame further comprising:
      a pair of support brackets;
      a horizontal brace, said brace attached to said support brackets; and
      a guide sleeve, said sleeve attached to said brace; and
   a guide track, said frame slidably connected to said guide track.

9. A wafer cutting device as defined in claim 8 wherein a linear actuator motor having a screw thereon engages with said guide sleeve of said frame from the purpose of moving said crystal holder in a z-axis direction.

* * * * *